United States Patent [19]
Ryu et al.

[11] 4,333,063
[45] Jun. 1, 1982

[54] AMPLITUDE EQUALIZER

[75] Inventors: Toshihiko Ryu; Yutaka Koizumi, both of Tokyo, Japan

[73] Assignee: Nippon Electric Co., Ltd., Tokyo, Japan

[21] Appl. No.: 212,164

[22] Filed: Dec. 2, 1980

[30] Foreign Application Priority Data

Dec. 3, 1979 [JP] Japan .............................. 54-156609
Dec. 3, 1979 [JP] Japan .............................. 54-156610

[51] Int. Cl.³ ...................... H03H 7/03; H03H 11/06
[52] U.S. Cl. ................................. 333/18; 333/28 R
[58] Field of Search ............................. 333/18, 28 R

[56] References Cited
U.S. PATENT DOCUMENTS

| | | | |
|---|---|---|---|
| 2,981,892 | 4/1961 | Franks et al. ................. | 333/28 R X |
| 3,551,854 | 12/1970 | Endo et al. ..................... | 333/28 R |
| 3,663,898 | 5/1972 | Kao et al. ....................... | 333/28 R X |
| 3,691,486 | 9/1972 | Borsuk et al. ................. | 333/28 R X |
| 4,258,340 | 3/1981 | Ryu ................................. | 333/18 |
| 4,266,204 | 5/1981 | Jacoby ............................ | 333/28 R |

*Primary Examiner*—Paul L. Gensler
*Attorney, Agent, or Firm*—Sughrue, Mion, Zinn, Macpeak & Seas

[57] ABSTRACT

An amplitude equalizer is provided for equalizing amplitude distorted signals within a predetermined frequency band. The amplitude equalizer comprises first means for splitting signals into first and second split signals. A first delay device receives one of the two split signals, and a second signal splitter splits the output of the first delay device into third and fourth split signals, the third split signal being applied to a second delay device having a delay equal to the delay of the first delay device. The output of the second delay device is combined with the second output from the first signal splitter in a first signal combiner, the output of which is applied to a circuit for adjusting the polarity and gain of the signal applied thereto. The output of the polarity and gain adjusting circuit is applied to a second signal combiner which combines the adjusted signal with the fourth output from the second signal splitter to thereby provide equalized signals. As organized above, the equalizer can provide for arbitrary selection of the desired frequency regions and maximium equalized amplitude by simply varying either the amplitude or attenuation factor, and by properly choosing the delay time. Further, equalization of secondary and higher order distortion can be achieved by virtue of constant delay over the entire frequency region.

4 Claims, 7 Drawing Figures

AMPLITUDE EQUALIZER

BACKGROUND OF THE INVENTION

The present invention relates to an amplitude equalizer for use in a signal transmission system.

A signal transmission system requires amplitude equalization to realize desired transmission characteristics. One such equalizer, the transversal filter described in "Principles of Data Communications," MacGraw-Hill, 1968, Chapter 6, is well known. This filter comprises a plurality of delay lines and means for synthesizing a signal from each tap of the delay lines with predetermined weighting. The equalizer of this type, however, has drawbacks in that (i) the required circuit network becomes enormous as the number of taps increases since the gain of each tap must be controlled, and (ii) the delay time in each delay line should be selected to be equal to the inverse of the data transmission rate. This equalizer, therefore, could not be utilized in a system where transmission rate is close to the inverse number of the delay time and is thus of limited use.

An improved equalizer has been also proposed in a co-pending U.S. patent application Ser. No. 29,503, filed on Apr. 12, 1979 now U.S. Pat. No. 4,258,340, by the same assignee as the present application. The amplitude equalizer described therein includes a phase shift circuit and two variable attenuators.

SUMMARY OF THE INVENTION

An object of the present invention is to provide an amplitude equalizer without any delay distortion and which only requires a small circuit network.

A first embodiment of the present invention provides an amplitude equalizer for equalizing signals having amplitude distortion within a predetermined frequency band. The amplitude equalizer comprises first means for dividing input signals into two signals, second means connected to one of the outputs of the first means and having a predetermined delay time within the frequency band, third means for dividing the output signal from the second means into two further signals, fourth means connected to one of the outputs of the third means and having a delay time equal to the delay time of said second means, fifth means for combining the other output from the first means and the output from the fourth means, sixth means for varying at least one of the amplitude and polarity of the output signal from the fifth means, and seventh means for combining the other output from the third means and the output from the sixth means to provide equalized signals.

A second embodiment of the amplitude equalizer comprises first means for dividing input signals into three signals, second means connected to the first output from the first means and having a first delay time within the frequency band, third means connected to the second output from the first means and having a second delay time twice as long as the first delay time, fourth means for combining the output of the third means and the first means, fifth means for varying at least either of the amplitude or polarity of the output signal from the fourth means, and sixth means for combining the output from the second means and the output from the fifth means to provide equalized signals.

BRIEF DESCRIPTION OF THE DRAWINGS

The aforementioned object and other features of the present invention will become more apparent by referring to the following description taken in conjunction with the attached drawings, in which.

DESCRIPTION OF THE PREFERRED EMBODIMENT

Figure 1:
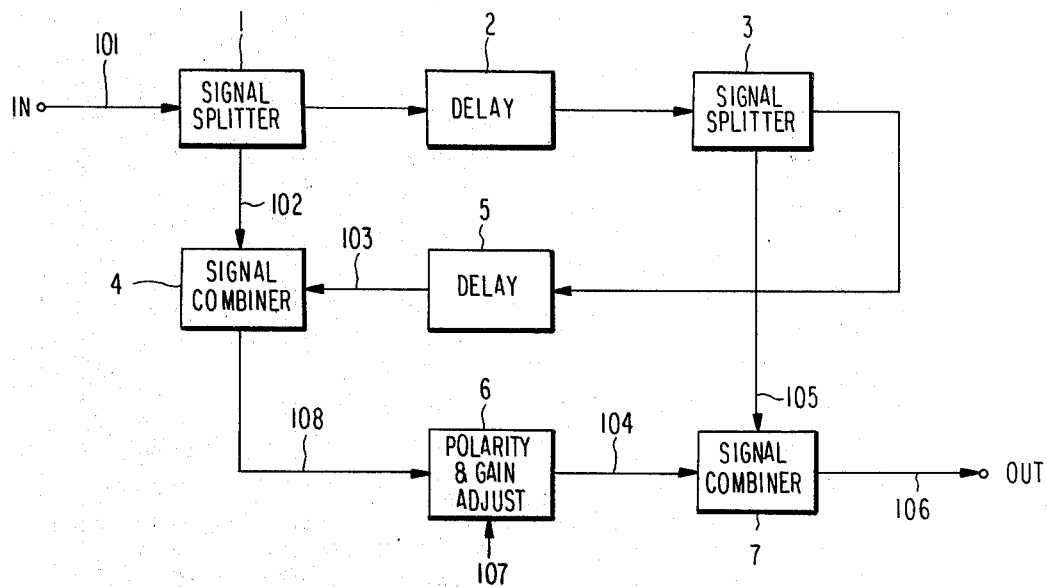
FIG. 1 is a block diagram of an embodiment of a variable equalizer according to the present invention.

The variable equalizer in accordance with the present invention is illustrated in FIG. 1. An input signal is applied to a signal splitter 1 via input line 101. Signal splitter 1, along with a similar signal splitter 3, operates to simply divide the input signal into two outgoing paths. The first of these outgoing paths is applied to the second signal splitter 3 via delay device 2. The second output from signal splitter 1 is applied to a first input of signal combining circuit 4 which operates to add the two signals applied thereto to form a sum signal. One of the outputs from signal splitter 3 is applied to the combining circuit 4 via a second delay device 5, the delays in the delay devices 2 and 5 being equal. The output from signal combiner 4 is applied to a polarity and gain adjustment device 6 which is provided for selectively varying the signal polarity and amplitude of the signal applied thereto. The output of the polarity and gain adjusting device is applied to a first input of a second signal combiner 7, which receives its second input from the second output of signal splitter 3. The combined output signal from combiner 7 represents the output of the equalizer. Signal splitters 1 and 3 and signal combiners 4 and 7 are of well-known construction.

Where the input signal fed to the input terminal 101 is $e^{j\omega t}$ the delay time in the delay circuits 2 and 5 is $\tau$, the amplification or attenuation factor in the circuit 6 is $\alpha$, and signals at the points 104 and 105 defined as $A_1$ and $B_1$, the values of $A_1$ and $B_1$ are given by $$A_1 = \alpha \{ e^{j\omega t} + e^{j\omega(t-2\tau)} \}, \tag{1}$$

$$B_1 = e^{j\omega(t-\tau)}. \tag{2}$$

Therefore, the signal at the tap 106 will be given by $$C_1 = A_1 + B_1 = e^{j\omega(t-\tau)} \times \{1 + \alpha(e^{j\omega\tau} + e^{-j\omega\tau})\} = e^{j\omega t} \times e^{-j\omega\tau} \{1 + 2\alpha \cos \omega\tau\}. \tag{3}$$

Accordingly, the transmission characteristics (the transfer function) $T_1(\omega)$ of the equalizer can be expressed in the following equation:

$$T_1(\omega) = (1 + 2\alpha \cos \omega\tau) e^{-j\omega\tau}. \tag{4}$$

It it is assumed that the characteristic functions of amplitude, phase and delay time are respectively $S_1(\omega)$, $\theta_1(\omega)$ and $D_1(\omega)$ the relation therebetween is given by:

$$T_1(\omega) = S_1(\omega) \cdot e^{-j\theta_1(\omega)}, \tag{5}$$

$$S_1(\omega) = 1 + 2\alpha \cos \omega\tau, \quad (6)$$

$$\theta_1(\omega) = -\omega\tau, \quad (7)$$

and $$D_1(\omega) = -d\theta_1(\omega)/d\omega = \tau \text{(constant)}. \quad (8)$$

In the above equations, although $S_1(\omega)$ varies as a function of $\alpha$, $D_1(\omega)$ will be always constant irrespective of variations in $\alpha$ and $\omega$, thereby generating no delay distortions. Thus, without causing any delay distortions at all, the amplitude vs. frequency characteristics can be separately equalized.

Figure 2:
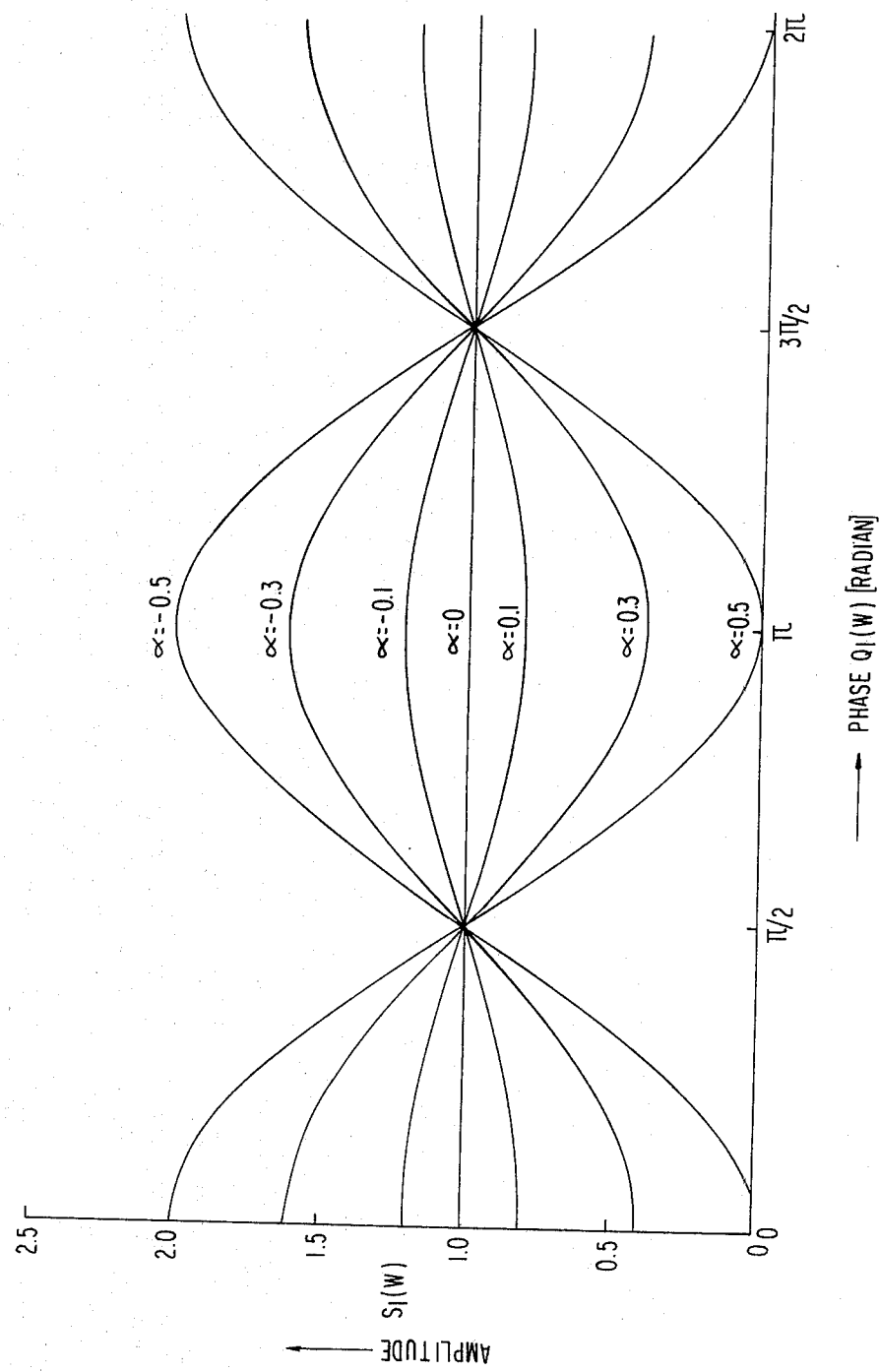
FIG. 2 shows amplitude characteristic curves of the case where the delay is kept at a constant value and the amplitude factor or attenuation factor is varied.

FIG. 2 shows the variation of $S_1(\omega)$ as $\alpha$ increases from $-0.5$ to $0.5$. The zones of 0 to $\pi$, and $\pi$ to $2\pi$ are the regions usable as positive/negative linear slope equalizers and the zones of $\pi/2$ to $3\pi/2$ are the regions usable as positive/negative secondary or higher order curvature equalizers. For example, when an amplitude equalizer usable in a frequency band (band zone) is desired, assuming that the center frequency of the frequency band zone is $f_o$, a value of $\tau$ satisfying the equation $\tau_1 = \frac{1}{4}f_o$ may be chosen for the equalizer generating the linear slope distortion, while a value of $\tau$ satisfying the equation $\tau_2 = \frac{1}{2}f_o$ may be chosen as the delay for an equalizer generating the secondary or higher order curvature distortion. As clearly shown in FIG. 2, by simply varying $\alpha$, amplitude distortion of either polarity can be generated.

Figure 3:
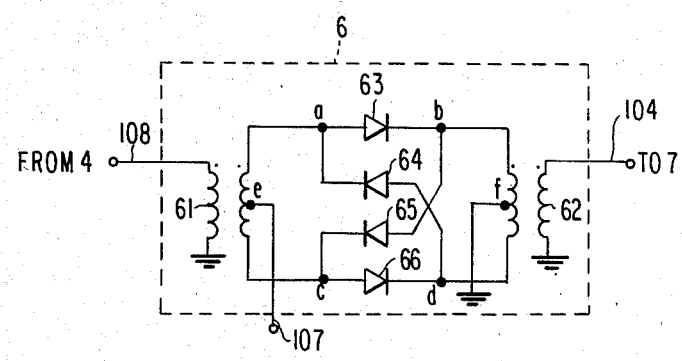
FIG. 3 shows an embodiment of the variable circuit 6 of FIG. 1.

The polarity and gain adjust circuit 6, shown in detail in FIG. 3, is a balanced mixer comprising transformers 61 and 62 and diodes 63 to 66. When a control voltage of the positive polarity is fed to a terminal 107, diodes 63 to 66 are turned "ON" to form a loop (e, a, b, f, d, c, e) and the input signal to a terminal 108 is either amplified or attenuated to provide the output to terminal 104. The outgoing signal has the polarity identical with that of the incoming signal. When the control voltage of a negative polarity is supplied subsequently, diodes 64 and 65 are turned "ON" to form a loop (e, a, d, f, c, e) and the polarities of the output signal become inverted. The level of the output signal is determined according to the level of the control voltage. Thus, the circuit 6 provides a selectable polarity and gain adjustment. In some cases, however, a circuit which varies amplitude alone, such as a variable attenuator or a variable amplifier, depending on the amplitude distortions in the radio path, may be used.

Figure 4:
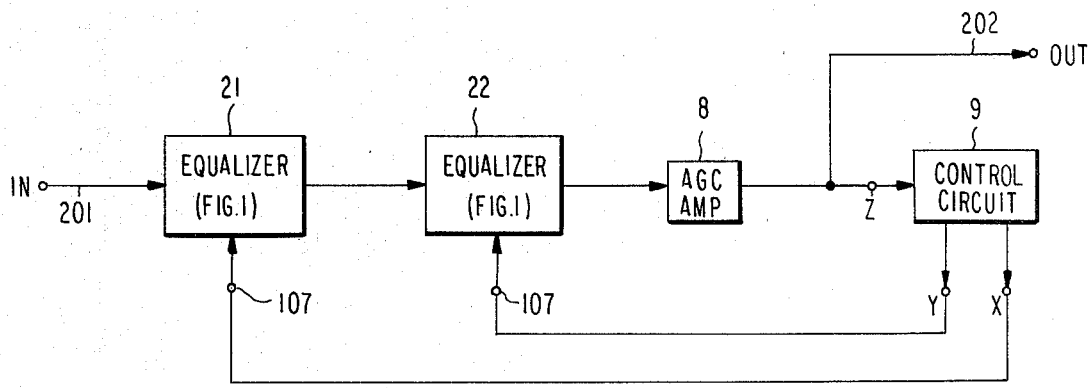
FIG. 4 is a block diagram of an embodiment of an automatic equalizer according to the present invention.

The present invention may readily be extended to an automatic amplitude equalizing circuit. In FIG. 4, each of the circuits 21 and 22 is identical to the equalizer shown in FIG. 1. The equalizers can be designed for linear slope or secondary or higher order curvature distortions by selecting appropriate $\tau$ values. The reference numeral 8 denotes an automatic gain control (AGC) amplifier, and 9 denotes a control circuit for detecting transmission distortion, or the spectral envelope of incoming signals, in order to control equalizers 21 and 22 in accordance therewith. The AGC amplifier 8 provides a constant output level and it may therefore be omitted if it is used exclusively for equalizing frequency characteristics. Reference numeral 201 denotes the signal input terminal while 202 denotes the signal output signal terminal. The input signal is applied to the first equalizer 21. The second equalizer 22 receives the output from the first equalizer 21 and provides a final output to the AGC amplifier 8. The output of the AGC amp 8 is provided as the output signal and as an input to the control circuit 9. The control circuit 9 provides first and second outputs X and Y to control equalizers 21 and 22, respectively.

Figure 5:
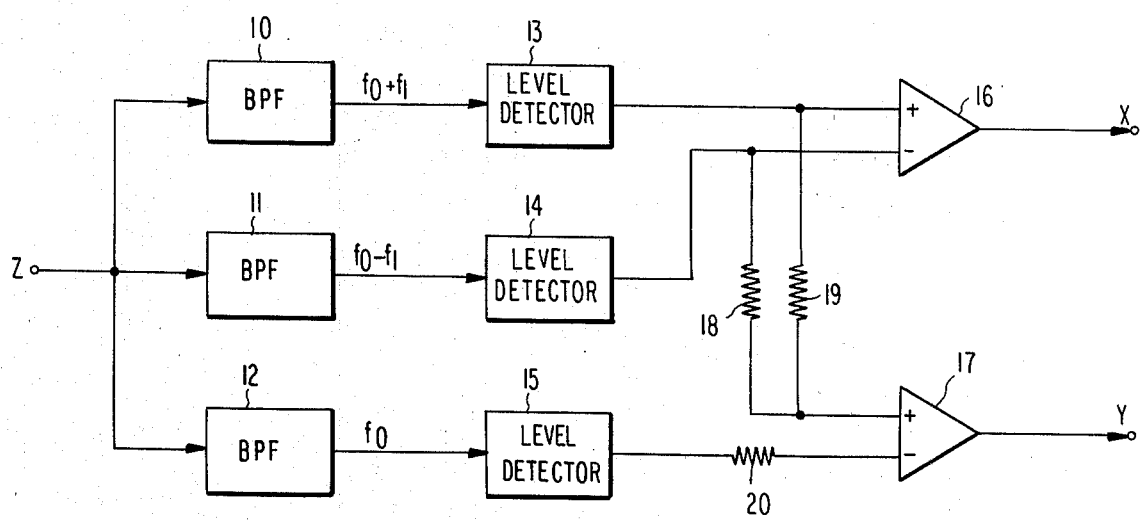
FIG. 5 is a block diagram of an embodiment of the control circuit shown in FIG. 4.

The control circuit 9 is shown in greater detail in FIG. 5. Reference numerals 10, 11 and 12 denote narrow bandpass filters having respective center frequencies of $(f_o+f_1)$, $(f_o-f_1)$ and $f_o$, where $f_o$ is the center frequency of the signal frequency band and $f_1$ is a predetermined frequency. Reference numerals 13, 14 and 15 denote level detectors, 16 and 17 denote differential amplifiers, and 18-20 denote resistors. The signal from the AGC amp 8 is applied in common to each of bandpass filters 10, 11 and 12. The respective outputs from the band pass filters are applied to an associated one of three level detectors 13, 14 and 15. The output of level detectors 13 and 14 are applied to the non-inverting and inverting inputs, respectively, of differential amplifier 16 to provide control signal X at the output thereof. The outputs of level detectors 13 and 14 are resistively coupled to the non-inverting input of the differential amplifier 17 through resistors 19 and 18, respectively. The output of level detector 15 is applied to the inverting input of differential amplifier 17 through resistor 20, to provide control signal Y at the output of differential amplifier 17.

Figure 6:
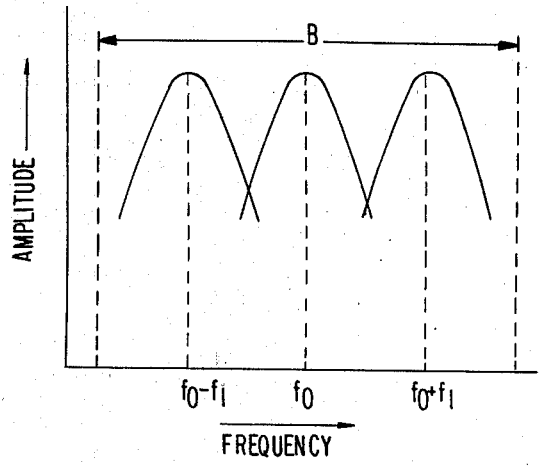
FIG. 6 shows characteristic curves of the filters 10 to 12 shown in FIG. 5.

FIG. 6 illustrates the amplitude vs. frequency characteristics of the filters 10-12, B denoting the signal frequency bandwidth. The differential amplifier 16 compares the outputs from the level detectors 13 and 14, namely signal components of the frequencies $f_o+f_1$ and $f_o-f_1$, to detect linear slope components and the polarities thereof. The differential amplifier 17, on the other hand, compares the mean output from the level detectors 13 and 14 with the output of the level detector 15, namely the signal components near $f_o$ to detect the secondary or high order curvature components and the polarity thereof. If the equalizer is designed to equalize only the linear slope components, filter 12, detector 15 and differential amplifier 17 may be omitted. On the other hand, if the equalizer is designed to equalize only the secondary or higher order curvature components, differential amplifier 16 may be omitted. The output signals X and Y from the differential amplifiers 16 and 17 are supplied to the terminals 107 of the circuits 21 and 22, respectively.

Figure 7:
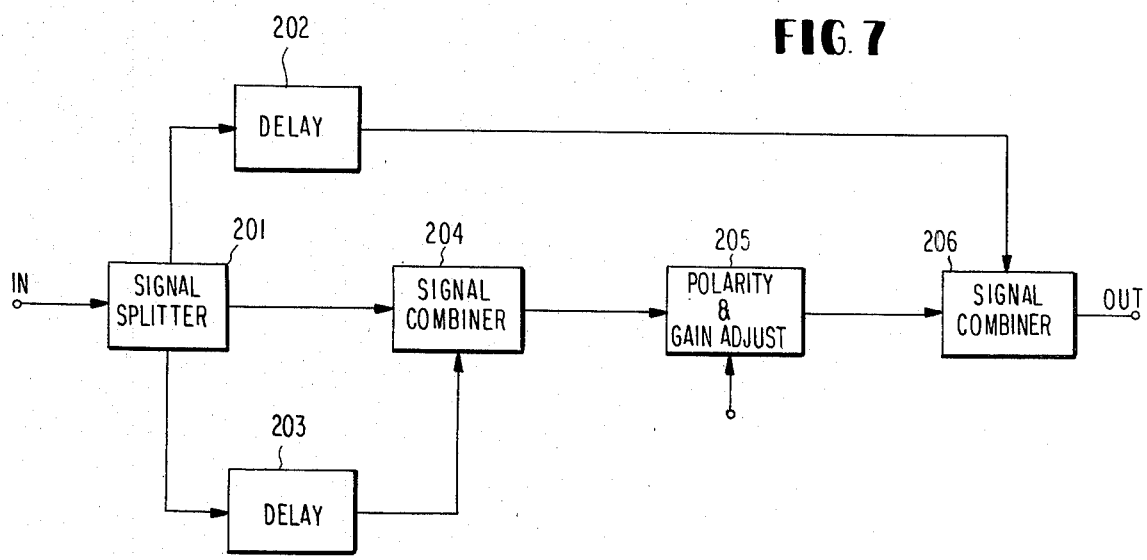
FIG. 7 is a block diagram of another embodiment of a variable equalizer according to the present invention.

A second embodiment of the equalizer in accordance with the present invention is illustrated in FIG. 7. The input signal is applied to signal splitter 201 which divides the incoming signal into three outgoing paths. The first of the outgoing paths from splitter 201 is applied to delay device 202, the second output from splitter 201 is applied to signal combiner 204, and the third output from splitter 201 is also applied to signal combiner 204 via delay device 203. The delay circuit 203 provides a delay twice as long as delay circuit 202. The output of signal combiner 204 is applied to a polarity and gain adjustment circuit 205, having a construction identical to that of FIG. 3. The output of the polarity and gain adjust circuit 205 is applied to a first input of signal combiner 206, the signal 206 receiving a second input from delay device 202. The output of the equalizer in accordance with the present invention is taken from the combined output from combiner 206.

From the foregoing, it can be easily understood that the characteristics of the variable equalizer of FIG. 7 are the same as the variable equalizer of FIG. 1.

As has been described in the foregoing, the present invention provides an amplitude equalizer wherein desired frequency regions and the maximum equalized amplitude can be arbitrarily selected by simply varying either the amplitude or attenuation factor α, provided that delay time ($\tau$, $2\tau$) is chosen appropriately. Also, the equalizer according to the present invention is suitable for equalizing secondary or high order curvature distortion since constant delay is achieved over the entire frequency region.

What we claim is:

1. An amplitude equalizer for equalizing input signals having amplitude distortion within a predetermined frequency band, comprising:
   (i) first means for splitting said input signals into first and second output signals;
   (ii) second means receiving said first output signal and having a predetermined delay time within said frequency band to provide a first delayed output;
   (iii) third means for splitting said first delayed output into third and fourth output signals;
   (iv) fourth means receiving said third output signal and having a delay time equal to said predetermined delay time to provide a second delayed output;
   (v) fifth means for combining said second output signal and said second delayed output to provide a first combined signal;
   (vi) sixth means for varying at least one of the amplitude and polarity of said first combined signal to provide an adjusted signal; and
   (vii) seventh means for combining said fourth output signal and said adjusted signal to provide equalized signals.

2. An amplitude equalizer for equalizing input signals having amplitude distortion within a predetermined frequency band, comprising:
   (i) first means for splitting said input signals into first, second and third output signals;
   (ii) second means receiving said first output signal and having a first delay time within said frequency band to provide a first delayed signal;
   (iii) third means receiving said second output signal and having a second delay time twice as long as said first delay time to provide a second delayed signal;
   (iv) fourth means for combining said third output signal and said second delayed signal to provide a combined signal;
   (v) fifth means for varying at least one of the amplitude and polarity of said combined signal to provide an adjusted signal; and
   (vi) sixth means for combining said first delayed signal with said adjusted signal to provide equalized signals.

3. An amplitude equalizer having an input signal terminal for receiving signals having amplitude distortion within a predetermined frequency band, and an output signal terminal, comprising a plurality of amplitude equalizing means provided in series between said input signal terminal and said output signal terminal, and control means connected to the output of the final stage of said amplitude equalizing means for detecting amplitude vs. frequency characteristics of said signals to provide a control signal, each of said amplitude equalizing means comprising:
   (i) first means for splitting said input signals into first and second output signals;
   (ii) second means receiving said first output signal and having a predetermined delay time within said frequency band to provide a first delayed output;
   (iii) third means for splitting said first delayed output into third and fourth output signals;
   (iv) fourth means receiving said third output signal and having a delay time equal to said predetermined delay time to provide a second delayed output;
   (v) fifth means for combining said second output signal and said second delayed output to provide a first combined signal;
   (vi) sixth means for varying at least one of the amplitude and polarity of said first combined signal to provide an adjusted signal; and
   (vii) seventh means for combining said fourth output signal and said adjusted signal to provide equalized signals.

4. An amplitude equalizer having an input signal terminal for receiving signals having amplitude distortion within a predetermined frequency band, and an output signal terminal, comprising a plurality of amplitude equalizing means provided in series between said input signal terminal and said output signal terminal, and control means connected to the output of the final stage of said amplitude equalizing means for detecting amplitude vs. frequency characteristics of said signals to provide a control signal, each of said amplitude equalizing means comprising:
   (i) first means for splitting said input signals into first, second and third output signals;
   (ii) second means receiving said first output signal and having a first delay time within said frequency band to provide a first delayed signal;
   (iii) third means receiving said second output signal and having a second delay time twice as long as said first delay time to provide a second delayed signal;
   (iv) fourth means for combining said third output signal and said second delayed signal to provide a combined signal;
   (v) fifth means for varying at least one of the amplitude and polarity of said combined signal to provide an adjusted signal; and
   (vi) sixth means for combining said first delayed signal with said adjusted signal to provide equalized signals.

* * * * *